(12) United States Patent
Morita et al.

(10) Patent No.: US 7,503,699 B2
(45) Date of Patent: Mar. 17, 2009

(54) WHEEL AXLE BEARING UNIT

(75) Inventors: Shinji Morita, Shizuoka-ken (JP); Hisashi Ohtsuki, Shizuoka-ken (JP)

(73) Assignee: NTN Corporation, Osaka-Fu (JP)

( * ) Notice: Subject to any disclaimer, the term of this patent is extended or adjusted under 35 U.S.C. 154(b) by 706 days.

(21) Appl. No.: 11/040,099

(22) Filed: Jan. 24, 2005

(65) Prior Publication Data

US 2005/0185871 A1 Aug. 25, 2005

(30) Foreign Application Priority Data

Jan. 29, 2004 (JP) ............................. 2004-021825

(51) Int. Cl.
*F16C 19/18* (2006.01)
*F16C 33/66* (2006.01)

(52) U.S. Cl. ...................... 384/544; 384/589

(58) Field of Classification Search ................. 384/544, 384/589

See application file for complete search history.

(56) References Cited

U.S. PATENT DOCUMENTS 6,368,223 B1 * 4/2002 Ouchi et al. ................. 464/145
6,574,865 B2 * 6/2003 Meeker et al. .......... 29/894.361
6,575,637 B1 * 6/2003 Tajima et al. ................ 384/544

FOREIGN PATENT DOCUMENTS

| JP | 61-23519 U | 2/1986 |
| JP | 2000-085306 | 3/2000 |
| JP | 2003-104004 | 4/2003 |

* cited by examiner

*Primary Examiner*—William C Joyce
(74) *Attorney, Agent, or Firm*—Arent Fox LLP

(57) ABSTRACT

A wheel axle bearing unit for a vehicle is to be made lighter in weight, so as to prolong a life span thereof. A first grooved portion is formed by removing an excess in thickness in a region between dual raceways on an outer circumferential surface of a hub and an inner race which constitute the inner member of the wheel axle bearing unit, for enlarging a space inside the bearing, thereby increasing an amount of grease that can be retained in the region between the dual raceways. Also at a position corresponding to the first grooved portion, a second grooved portion is formed by removing an excess in thickness on an inner circumferential surface of an outer race, which constitutes an outer member.

13 Claims, 3 Drawing Sheets

WHEEL AXLE BEARING UNIT

BACKGROUND OF THE INVENTION

1. Field of the Invention

The present invention relates to a wheel axle bearing unit, and more particularly to a bearing unit that has an enlarged space inside the bearing, for preventing overheating and leakage of grease, as well as for making the unit lighter in weight.

2. Description of the Related Art

FIG. 3 shows a conventional wheel axle (non-driven) bearing unit 11. The bearing unit 11 is called a third generation bearing unit, which includes an outer race 12 constituting an outer member, provided with dual raceways namely outer raceways 12a, 12b along an inner circumferential surface thereof, a hub 13 provided with an outer-side inner raceway 13a along an outer circumferential surface thereof, an inner race 14 provided with an inner-side inner raceway 14a along an outer circumferential surface thereof and fitted to an outer circumferential surface of the hub, spherical rolling elements 15 aligned in dual rows between the outer raceways 12a, 12b of the outer race 12 and the inner raceways 13a, 14a of the hub 13 and the inner race 14, and retainers 16, 17 each of which retains the rolling elements 15 at regular intervals in a circumferential direction. The hub 13 and the inner race 14 are integrally formed, and serve as an inner member.

A body mounting flange 18 is provided on an outer circumferential surface of the outer race 12, and a wheel mounting flange 19 is provided on an outer circumferential surface of the hub. A wheel (not shown) is mounted to the wheel mounting flange 19 with a plurality of bolts 20. A short cylindrical portion 13b formed at an inner end portion of the hub 13 is plastically deformed in a radial direction, thus to be pressed against an end face of the inner race 14 with a predetermined pressure. A first seal 21 is disposed between the outer race 12 and the hub 13 at a position adjacent to an outer edge of the outer-side raceways 12a, 13a, and a second seal 22 is disposed between the outer race 12 and the inner race 14 at a position adjacent to an inner edge of the inner-side raceways 12b, 14a.

An appropriate amount of grease having high lubricity is sealed inside the bearing (a portion constituted of the raceways and the rolling elements) of the wheel axle bearing unit 11. The first seal 21 and the second seal 22 serve to prevent leakage of the grease. The sealed grease contains for example a mineral oil as a base oil, to which a predetermined weight percent of thickening agent is added. A thickening agent currently in popular use is an urea-based grease corresponding to type 1 according to JIS K 2220 for high load, viscosity number 2.

Oil film of the grease on a contact face between the raceways 12a, 13a, 12b, 14a and the rolling elements 15 prevents occurrence of fretting, premature seizure and flaking. The oil film deteriorates with a load, temperature and so on, therefore it is desirable to constantly supply a trace of oil to the contact face between the raceways and the rolling elements during rotation. Accordingly, the grease is sealed in a central portion of the raceways and between the rolling elements, so as to fill approx. 50% of a space inside the bearing. Here, a thrust roller bearing is known, which has an enlarged interior space so as to retain more amount of grease (Ref. Japanese Laid Open Patent No. 2000-85306).

A difference between the present invention and the Japanese Laid Open Patent No. 2000-85306 is that the latter is designed such that the outer race rotates, and that a groove is provided along an inner circumferential surface of the outer member, in which the grease is supplied for lubricating the raceway and the rolling elements. However, it has proved that in a system where the inner race rotates a centrifugal force is not applied to the outer member, and that hence such design is not workable.

The present invention is based on the inner race rotation, and a first grooved portion is provided along an outer circumferential surface of the inner member, so that the grease sealed in the first grooved portion is distributed by a centrifugal force to the raceways and the rolling elements. Also, a second grooved portion formed along an inner circumferential surface of the outer member is intended for depositing therein a surplus of the grease supplied from the first grooved portion and, therefore, the second grooved portion may be omitted, provided that an appropriate amount of grease is to be supplied.

While it is desirable, as already stated, that a trace of oil is constantly supplied to the raceways 12a, 13a, 12b, 14a, actually the grease sealed between the raceways 12a, 13a and the raceways 12b, 14a (shadowed area in FIG. 3) constitutes a layered structure of a uniform thickness, which is prone to flow even with relatively weak vibration. Consequently, in the case where a large amount of grease accidentally flows into between the rolling elements 15, there may be caused overheating because of fluid friction of the grease itself, or softening or oil separation due to breakdown of fiber structure of a thickening agent (for retaining an oily substance) in the event that the thickening agent has a low mechanical shear stability, which may even lead to grease leakage.

For preventing the grease leakage, decreasing a sealing amount of the grease can be an option. Also, a grease having a higher viscosity may be employed, or a shear stability of the thickening agent may be upgraded, in order to prevent overheating. However, since such measures are related with a life span of the bearing, the examination and solution-making are too complicated to readily carry out.

SUMMARY OF THE INVENTION

For solving the foregoing problem, the present invention provides a wheel axle bearing unit, comprising a flange on an outer circumferential surface thereof, via which to be mounted to a vehicle body; an outer member provided with dual outer raceways along an inner circumferential surface thereof; an inner member provided with inner raceways on an outer circumferential surface thereof at positions respectively corresponding to the dual outer raceways; rolling elements rollably disposed between the inner and outer raceways; and a pair of retainers which retain the rolling elements, wherein a first grooved portion is formed by removing an excess in thickness on an outer circumferential surface of the inner member between the dual raceways, for enlarging a space inside the bearing (a first aspect of the present invention).

The present invention also provides the wheel axle bearing unit as above, wherein a second grooved portion is formed by removing an excess in thickness on an inner circumferential surface of the outer member at a position corresponding to the first grooved portion (a second aspect of the present invention).

The present invention can be easily achieved at a low cost just by forming the groove at the same time as forming the outer circumferential surface of the inner member or the inner circumferential surface of the outer member, and besides the unit can be made lighter in weight by removing an excess in thickness.

Simply by forming the grooved portion on the outer member and the inner member, a space inside the bearing is enlarged by an amount equivalent to the grooved portion, and a grease deposit capacity is increased. Accordingly, such structure prevents overheating caused by intrusion of a large amount of grease into between the rolling elements due to vibration propagated to the bearing, and grease leakage because of softening or oil separation of a thickening agent due to mechanical shearing effect by the rolling elements.

The present invention also provides the wheel axle bearing unit as above, wherein the first or the second grooved portion is processed by cutting or roll forging (a third and a fourth aspect of the present invention).

Since the first and the second grooved portion is not a region where a load is directly imposed, any desired processing method can be employed, such as cutting and roll forging. Here, the roll forging may be either cold forging or hot forging.

The present invention also provides the wheel axle bearing unit as above, wherein a groove width (W) of the grooved portion of the inner member and/or the outer member is made shorter by 5 to 10 mm than a distance (L) in an axial direction between the raceways of the inner member and of the outer member, with a depth of 2 to 6 mm (a fifth, a sixth and a seventh aspect of the present invention).

The present invention also provides the wheel axle bearing unit as above, wherein the first grooved portion of the inner member and the second grooved portion of the outer member are formed according to the same standard (an eighth aspect of the present invention).

The present invention also provides the wheel axle bearing unit as above, wherein the outer member and the inner member are constituted of a carbon steel or a bearing steel containing 0.4 to 0.8% of carbon (a ninth aspect of the present invention).

According to the present invention, the first grooved portion is formed by removing an excess in thickness on an inner circumferential surface between the dual raceways of the inner member, so as to enlarge a space inside the bearing, therefore:

1. a grease deposit is provided in the first grooved portion, which prevents intrusion of a large amount of grease into between the rolling elements because of vibration or the like, thereby further preventing the grease leakage resultant from overheating of the grease between the rolling elements, or softening or oil separation of the thickening agent due to shearing effect of the rolling elements;

2. a life span of the bearing can be prolonged by preventing the grease leakage;

3. excessive grease between the rolling elements is discharged to the first grooved portion to be deposited therein, and a trace of oil is constantly supplied from the first grooved portion to a contact face between the raceways and the rolling elements during rotation, by which a life span of the bearing can be further prolonged, in collaboration with the prevention of the grease leakage;

4. the first grooved portion makes the bearing unit lighter in weight; and 5. the first grooved portion allows increasing an amount of the grease to be sealed in the bearing, and a relevant increase in thermal capacity of the grease leads to more effective heat absorption from the rolling elements, thereby suppressing a temperature increase of the bearing.

DESCRIPTION OF THE PREFERRED EMBODIMENT

Hereunder, an embodiment of the present invention will be described referring to the accompanying drawings.

Figure 1:
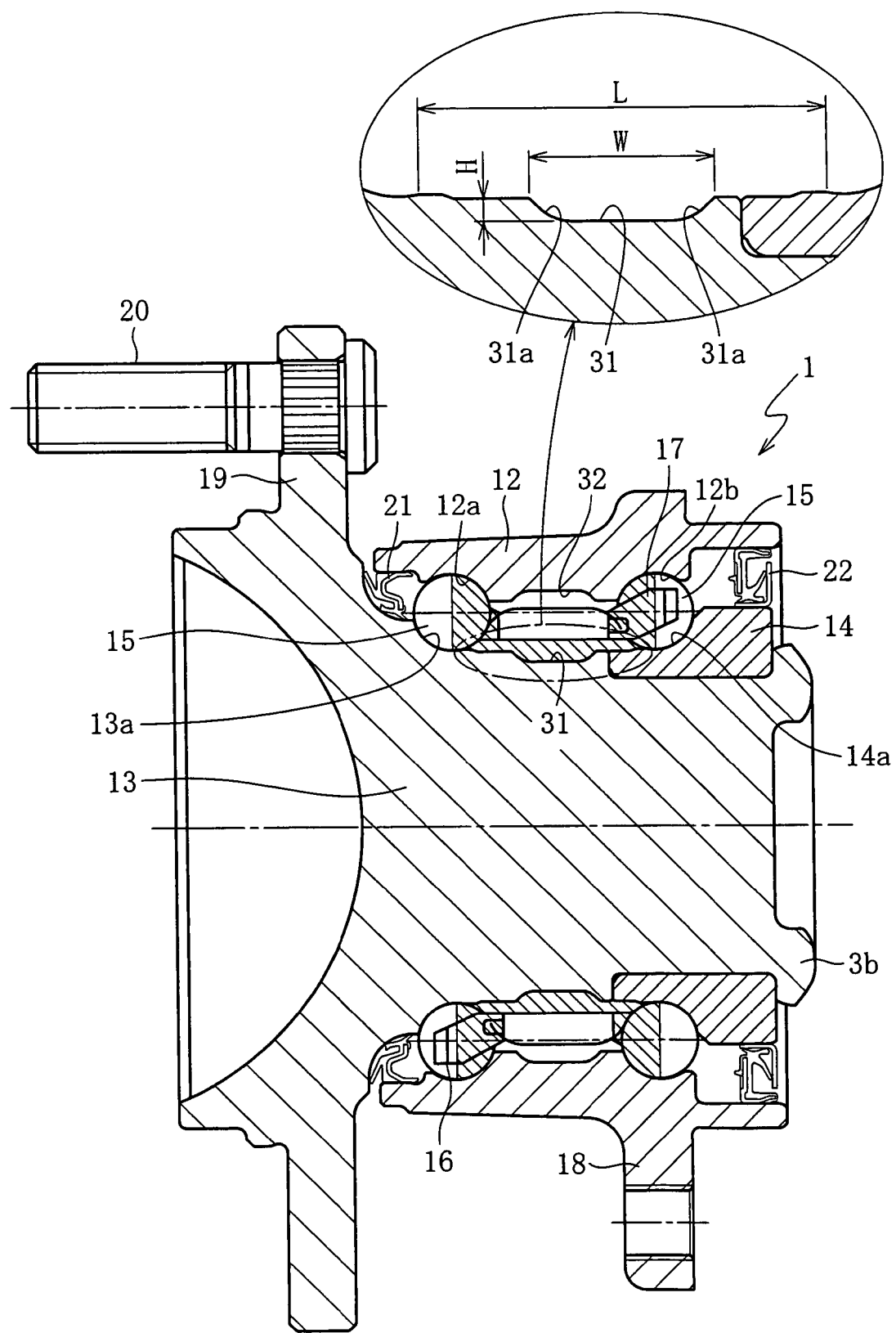
FIG. 1 is a cross-sectional view showing a wheel axle bearing unit according to the present invention.

FIG. 1 shows a bearing unit 1 for a wheel axle sustaining a non-driven wheel (a third generation wheel axle bearing unit) according to the embodiment of the present invention. As shown therein, the bearing unit 1 of the present invention is provided with a first grooved portion 31 formed on an outer circumferential surface of a hub 13 in a region adjacent to an inner edge of an outer-side inner raceway 13a of the hub 13, which is an inner member. The first grooved portion 31 may be formed not only on an outer circumferential surface of the hub 13 but also partly on an outer circumferential surface of the inner race 14.

A second grooved portion 32 is provided on an inner circumferential surface in a region between inner-side and outer-side outer raceways 12a, 12b of an outer race 12, which is an outer member. The first grooved portion 31 and the second grooved portion 32 enlarge a space inside the bearing, and an amount of grease (shadowed area in FIG. 1) that can be retained between the raceways 12a, 13a and the raceways 12b, 14a can be increased. The first grooved portion 31 and the second grooved portion 32 can be formed at a time in the working process of the hub 13 and the outer race 12, either by cutting or roll forging.

Figure 3:
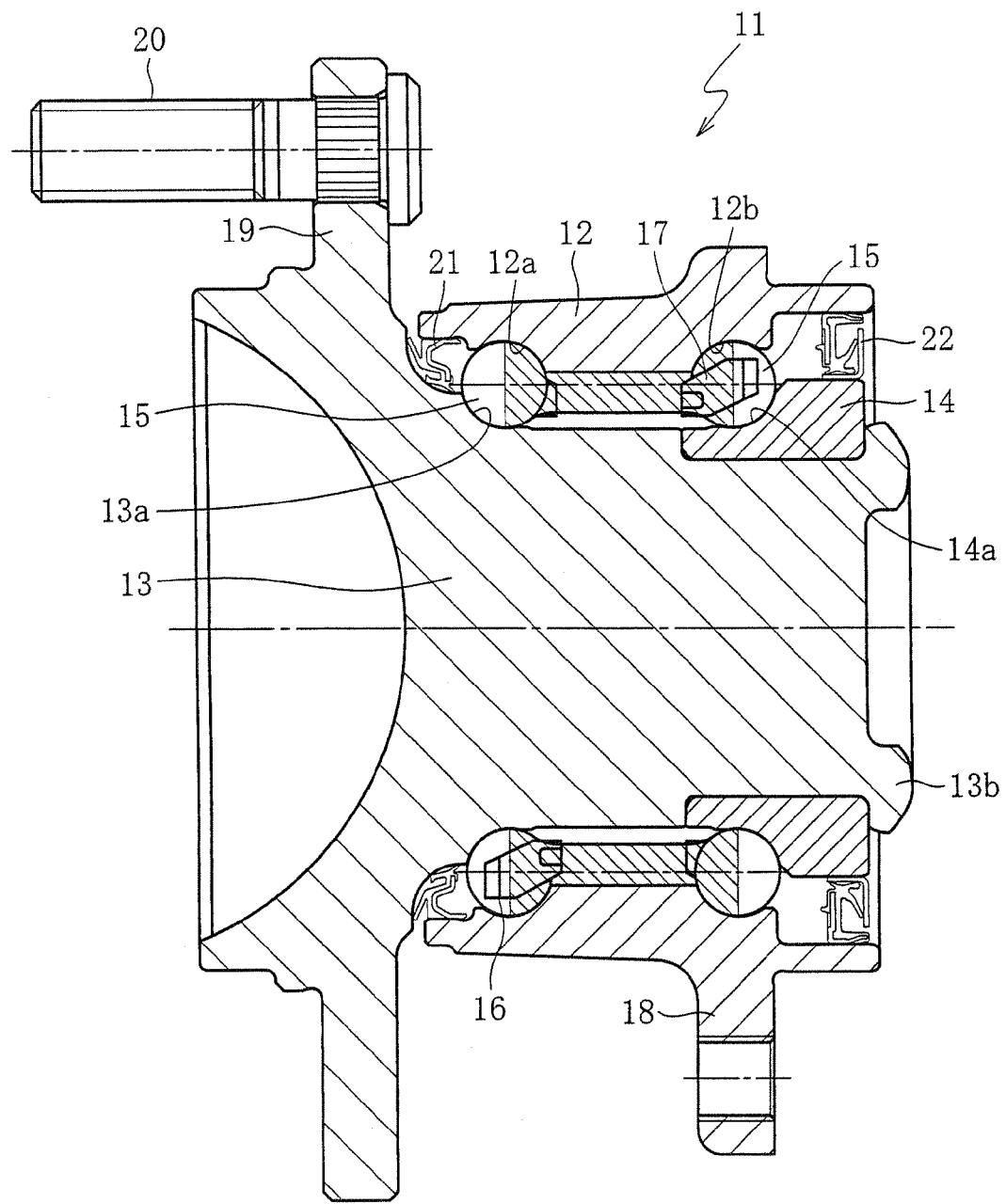
FIG. 3 is a cross-sectional view showing a conventional wheel axle bearing unit.

As shown in FIG. 1, the first and the second grooved portions 31, 32 have a flat trapezoidal cross-section, in which a groove width is denoted by W, and a depth by H as shown in the enlarged portion of FIG. 1. Preferably, the groove width W is 5 to 10 mm shorter than a distance L between the raceways of the inner member and outer member, and the depth H is 2 to 6 mm. In other words, an inclined portion (e.g., 31a of the first grooved portion 31) starts at a position 2.5 to 5 mm away from the edge of the raceways (e.g., outer raceways 12a, 12b). Such configuration allows stably supplying the grease to the inner raceways 13a, 14a and smoothly discharging an excess of the grease between the rolling elements 15 to the grooved portions 31, 32, without compromise in strength of the inner raceways 13a, 14a. The remaining portion of the wheel axle bearing unit 1 is similar to a conventional bearing unit 11 described according to FIG. 3, therefore the same constituents are given an identical numeral, and description thereof will be omitted.

Figure 2:
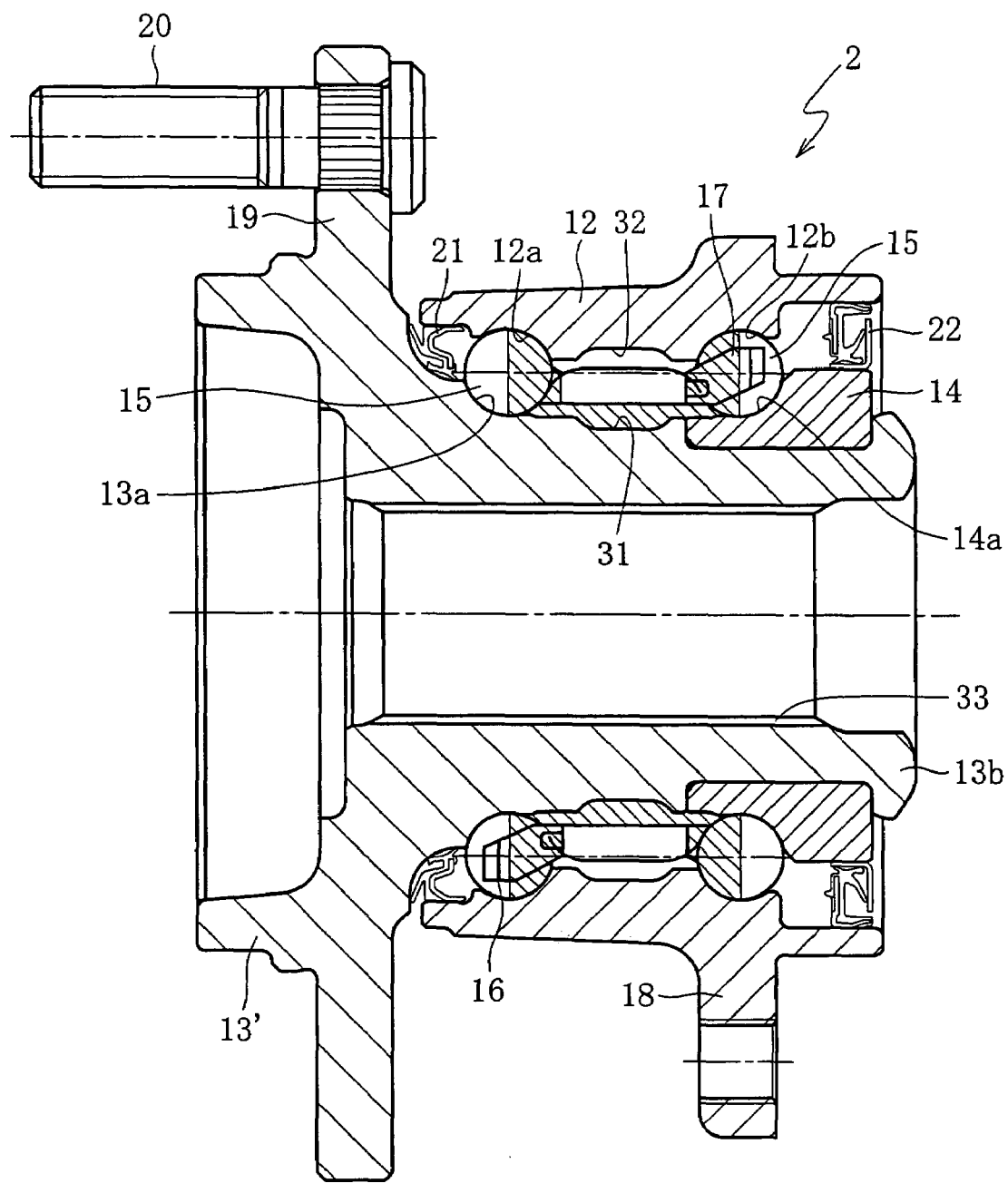
FIG. 2 is a cross-sectional view showing a modified wheel axle bearing unit according to the present invention.

Although an embodiment of the present invention has been described referring to the drawings, it is to be understood that the present invention is not limited to the foregoing embodiment, but that various modifications may be made without departing from the scope of the present invention. To cite a few examples, while the embodiment represents a bearing unit for a non-driven wheel axle, the present invention may also be applied to a driving wheel axle bearing unit 2 as shown in FIG. 2. In the bearing unit 2 also, the first grooved portion 31 and the second grooved portion 32 may be designed in exactly the same manner as FIG. 1. A serrated hole 33 is formed throughout a shaft center of the hub 13' of the bearing unit 2, and a driving shaft of a constant velocity universal joint is fitted to the serrated hole. A washer and a nut are attached to an end portion of the driving shaft, for joining the driving shaft and the hub. The remaining portion of the wheel axle bearing unit 2 is similar to a conventional bearing unit 11 described according to FIG. 3, therefore the same constituents are given an identical numeral, and description thereof will be omitted.

What is claimed is:

1. A wheel axle bearing unit, comprising:
   a flange on an outer circumferential surface thereof, via which to be mounted to a vehicle body;
   an outer member provided with dual outer raceways along an inner circumferential surface thereof;
   an inner member provided with at least one inner raceway on an outer circumferential surface thereof;
   rolling elements rollably disposed between said inner and outer raceways;
   an inner race having an inner raceway and fixed to an outer circumferential surface of the inner member by a radially deformed cylindrical portion formed at an inner end portion of the inner member, the at least one inner raceway of the inner member and the inner raceway of the inner race being positioned, respectively, so as to correspond to said dual outer raceways of the outer member, and
   a pair of retainers each of which retains said rolling elements;
   wherein a first grooved portion is formed by removing an excess in thickness on an outer circumferential surface of said inner member between said dual raceways, for enlarging a space inside the bearing, and
   wherein a boundary surface between the inner member and the inner race terminates in a space that is between the at least one inner raceway of the inner member and the inner raceway of the inner race and remote from the first grooved portion.

2. The wheel axle bearing unit as set forth in claim 1, wherein a second grooved portion is formed by removing an excess in thickness on an inner circumferential surface of said outer member at a position corresponding to said first grooved portion.

3. The wheel axle bearing unit as set forth in claim 2, wherein said first or said second grooved portion is processed by cutting or roll forging.

4. The wheel axle bearing unit as set forth in claim 2, wherein a groove width (W) of said grooved portion of said inner member and/or said outer member is made shorter by 5 to 10 mm than a distance (L) in an axial direction between said raceways of said inner member and of said outer member, with a depth of 2 to 6 mm.

5. The wheel axle bearing unit as set forth in claim 2, wherein said first grooved portion of said inner member and said second grooved portion of said outer member are formed to have matching configurations.

6. The wheel axle bearing unit as set forth in claim 2, wherein the second grooved portion has a trapezoidal cross-section defined by a pair of opposing inclined portions joined together by a planar central portion.

7. The wheel axle bearing unit as set forth in claim 6, wherein the planar central portion of the first grooved portion opposes the planar central portion of the second grooved portion.

8. The wheel axle bearing unit as set forth in claim 2, wherein the first grooved portion opposes the second grooved portion.

9. The wheel axle bearing unit as set forth in claim 1, wherein said first or said second grooved portion is processed by cutting or roll forging.

10. The wheel axle bearing unit as set forth in claim 9, wherein a groove width (W) of said grooved portion of said inner member and/or said outer member is made shorter by 5 to 10 mm than a distance (L) in an axial direction between said raceways of said inner member and of said outer member, with a depth of 2 to 6 mm.

11. The wheel axle bearing unit as set forth in claim 1, wherein a groove width (W) of said grooved portion of said inner member and/or said outer member is made shorter by 5 to 10 mm than a distance (L) in an axial direction between said raceways of said inner member and of said outer member, with a depth of 2 to 6 mm.

12. The wheel axle bearing unit as set forth in claim 1, wherein said outer member and said inner member are constituted of a carbon steel or a bearing steel containing 0.4 to 0.8% of carbon.

13. The wheel axle bearing unit as set forth in claim 1, wherein the first grooved portion has a trapezoidal cross-section defined by a pair of opposing inclined portions joined together by a planar central portion.

* * * * *